United States Patent Office 3,844,985
Patented Oct. 29, 1974

3,844,985
PHOTOCONDUCTIVE POLYETHER COMPOSITION HAVING PENDANT PYRROLE RINGS
Hideo Fukutani, Tokyo, Konoe Miura, Yokohama, and Tetsuo Murayama, Tokyo, Japan, assignors to Mitsubishi Chemical Industries Ltd., Tokyo, Japan
No Drawing. Filed Jan. 24, 1973, Ser. No. 326,172
Claims priority, application Japan, Feb. 1, 1972, 47/11,504
Int. Cl. C08f 3/38, 27/08; C08g 23/20
U.S. Cl. 260—2 A                                    13 Claims

ABSTRACT OF THE DISCLOSURE

A photoconductive polyether which comprises a polymer containing ether bonds in the principal or side chains thereof and containing pyrrole rings in the side chains which polyether contains units with the formula I, II, III or IV

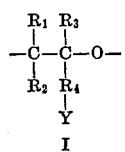   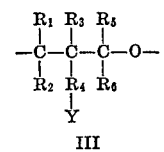

I                III

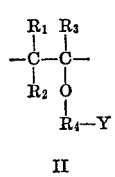   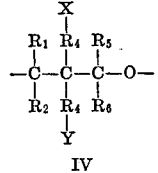

II               IV wherein $R_1$, $R_2$, $R_3$, $R_5$, and $R_6$ represent a hydrogen atom, a lower alkyl group or an aryl group; $R_4$ represents a $C_{1-6}$ alkylene group; X represents a halogen atom or a group containing a pyrrole ring; and Y represents a group containing a pyrrole ring.

BACKGROUND OF THE INVENTION

Field of the Invention

This invention relates to a photoconductive polyether composition. More particularly, it relates to a photoconductive polyether composition which is useful in electrophotographic processes.

Description of the Prior Art

Heretofore, polyvinylcarbazole has been used as an organic photoconductor which was disclosed in *J. Phys. Chem.*, 69 (3), 755–766 (1965). However, it has been shown that photoconductive layers prepared from polyvinylcarbazole have inferior mechanical properties as disclosed in *Denshi Kagaku* 21 (8), 77–84 by Y. Hayashi. Polyvinylcarbazole has a high sensitivity, but it has the disadvantages of low mechanical strength and adhesiveness. Accordingly, thin membranes may be difficult to form, and they may also be easily peeled from a substrate.

A need, therefore, exists for photoconductive compositions which have none of the mechanical disadvantages stated above. This invention provides certain polyethers having photoconductive rings which possess sufficient photoconductive sensitivity and have excellent mechanical strength, softness, ozone resistance and adhesiveness.

SUMMARY OF THE INVENTION

One object of this invention is to provide a photoconductive polyether composition which has a high mechanical strength, softness, ozone resistance and adhesiveness as well as a high photoconductive sensitivity.

Another object of this invention is to provide a process for preparing a photoconductive polyether which has a high mechanical strength, softness, ozone resistance, adhesiveness and a high photoconductive sensitivity.

Briefly, these objects and other objects of this invention as hereinafter will become apparent are achieved by a photoconductive polyether composition which comprises a photoconductive polyether containing ether bonds (—C—O—C—) in the main chain or in the side chains thereof and having pyrrole rings in the side chains as shown by the structures of the following polyether units:

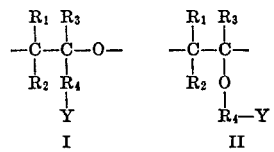

I               II

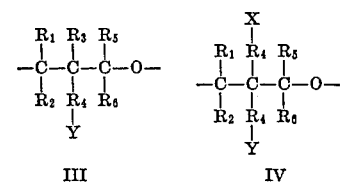

III              IV wherein $R_1$, $R_2$, $R_3$, $R_5$, and $R_6$ represent a hydrogen atom, a lower alkyl group or an aryl group; $R_4$ represents a $C_{1-6}$ alkylene group, especially a methylene group or an ethylene group; X represents a halogen atom or a group containing a pyrrole ring; and Y represents a group containing the pyrrole ring. Groups containing the pyrrole ring include the pyrrolyl group, the indolyl group or the carbazolyl group which have an inert substituent such as a halogen atom, a nitro group, a cyano group, a lower alkyl group, an aryl group, an alkoxy group, or an aryloxy group.

The photoconductive polyethers of this invention can be prepared by reacting a polyether having halogen atoms with pyrrole, a carbazole, an indole or a derivative thereof in the presence of an aprotic solvent.

DESCRIPTION OF PREFERRED EMBODIMENTS

Photoconductive polyethers are provided which have repeating units with the formula

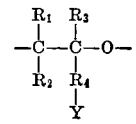

wherein $R_1$, $R_2$, $R_3$ represent a hydrogen atom, an alkyl group or an aryl group; $R_4$ represents a $C_{1-6}$ alkylene group, especially a methylene or an ethylene group; and Y represents a group containing the pyrrole ring, especially a pyrrolyl group, an indolyl group or a carbazolyl group which can be substituted with an inert substituent such as a halogen atom, a nitro group, a cyano group, a lower alkyl group, an aryl group, an alkoxy group or an aryloxy group.

Preferably, photoconductive polyethers are provided which contain repeating units having the formulas I', II', III', and IV':

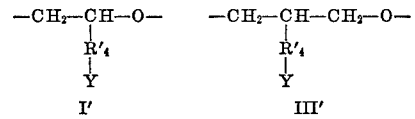

I'               III'

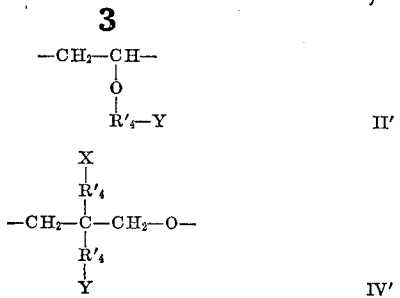

wherein R′₄ represents a methylene or ethylene group, X represents a halogen atom or a group containing a pyrrole ring and Y represents a group containing a pyrrole ring.

It is especially preferable to provide a photoconductive polyether which contains repeating units having the formula

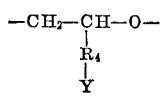

wherein R₄ represents methylene or ethylene, and Y represents a carbazolyl group which can have at least one inert substituent such as a halogen atom, a nitro group, a cyano group or a lower alkyl group on the ring.

The process of this invention is further described in detail. In order to prepare the photoconductive polyether I, polyethers containing halogen atoms used as the starting material can be polyethers prepared by polymerizing an epoxy compound containing a halogen atom such as epichlorohydrin, epibromohydrin, 1,2-dichloro-3,4-epoxybutane and 1,1-dichloro-2,3-epoxypropane; and polyethers prepared by copolymerizing said epoxy monomer with an alkylene oxide such as ethylene oxide, propylene oxide, butylene oxide or an epoxy ether such as methyl glycidyl ether, phenyl glycidyl ether and cyclohexyl glycidyl ether, or an epoxy compound containing no halogen atoms such as styrene oxide, oxetane, 3-methyloxetane and 3,3-dimethyloxetane. Moreover, it is possible to use a polyether prepared from the halogenation of a polymer of an alkyleneoxide which contains no halogen atoms.

In order to prepare the photoconductive polyethers II, III, and IV the starting materials can be a polymer of a halogenoalkyl vinyl ether such as 2-bromoethyl vinyl ether or 2-chloroethyl vinyl ether, a polymer of 3-chloromethyloxetane or 3-bromomethyloxetane, and a polymer of 3,3-dichloromethyloxetane or 3,3-dibromomethyloxetane, respectively.

Various polyethers prepared by copolymerizing each monomer and an epoxy compound containing no halogen atoms can be used in the preparation of the photoconductive polyether (I). If said polyether containing halogen atoms is reactivated with said pyrrole, indole, carbazole, or a derivative thereof, polyethers containing units with formulas I, II, III or IV can be obtained by substituting a portion of all of the halogen atoms of the polyether with said pyrrole, indole, carbazole, or a derivative thereof.

The amount of units with the formulas I, II, III or IV in the entire polyether is usually greater than 5%, preferably greater than 35%, especially greater than 70%, and most preferably 100%.

Suitable derivative of the pyrrole ring containing compound include rings substituted with alkyl groups, aryl groups, halogen atoms, nitro groups, cyano groups, alkoxy groups, aryloxy groups, and the like. It is also possible to use alkali metal salts of the pyrrole ring containing compounds which include the sodium salts, potassium salts, or lithium salts of pyrrole, indole or carbazole.

Polyether containing halogen atoms react with said pyrrole, indole, carbazole, or derivatives thereof in aprotic solvents. Suitable solvents are preferably polar aprotic solvents which include substituted amides such as N,N-dimethylformamide, N,N-dimethylacetamide, N-methyl-2-pyrrolidone; or dimethyl sulfoxide, sulfolane, hexamethyl phosphoramide, acetonitrile or nitrobenzene. However, it is also possible to use non-polar aprotic solvents which include ethers such as diethylene glycol-dimethyl ether or aromatic hydrocarbons such as toluene, xylene. These reactions can be smoothly conducted in said polar aprotic solvents in the presence of bases which include alkali metal hydroxides such as lithium hydroxide, sodium hydroxide, potassium hydroxide and alkali metal carbonates such as potassium carbonate and sodium carbonate. The bases of choice are the alkali metal hydroxides.

If an alkali metal salt of pyrrole, indole, carbazole or derivatives thereof is used, it is unnecessary to use a base. The alkali metal salts of pyrrole, indole, or carbazole can be prepared by melting a free pyrrole, indole or carbazole with an alkali metal compound such as potassium hydroxide, or by reacting the pyrrole ring containing compound with an alkali metal amide, an alkali metal hydride or the like. The reaction can be usually conducted at a temperature from room temperature to the boiling point of the solvent, preferably from 40–100° C. After the reaction is completed, the reaction mixture is treated with a non-solvent liquid such as water to precipitate the resulting polymer. On the other hand, polyethers containing units of formulas I, II, III, or IV can also be obtained by homo- or copolymerizing an epoxy compound containing units of these formulas.

A photoconductive composition is usually prepared by dissolving said polyether in a solvent. Suitable solvents include any inactive organic solvent which dissolves the resulting polymer, and includes dimethylformamide, dimethyl sulfoxide, chlorobenzene, tetrahydrofuran, 1,2-dichloroethane, and the like.

The composition of this invention can contain various sensitizers which include protonic acids such as trichloroacetic acid, quinones such as anthraquinone, an electron acceptor which is able to form a charge transfer complex, such as 2,4,7-trinitrofluorenone, and tetracyanoethylene, and dyes such as crystal violet, methylene blue and the like. The composition of this invention can also be admixed with another photoconductive compound such as polyvinylcarbazole. The sensitizer is usually added in amounts ranging from 0.01–100 wt. percent, preferably 0.01–20 wt. percent to the polymer. It is also possible to add various auxiliary agents such as plasticizers, dyes, pigments, stabilizers and the like.

The composition of this invention can be used as follows. A solution of the composition is coated on a substrate such as zinc, copper, an aluminum plate, paper or a plastic film or sheet to form the photoconductive layer. The photoconductive layer is charged by a corona discharge in the absence of light and is exposed to light through a master. The exposed layer is developed and fixed to give a visible image.

The photoconductive compositions of this invention which comprise photoconductive polyether have remarkably excellent mechanical strength and adhesion. Thus, thin photosensitive layers can be easily formed on various substrates. The photosensitive layers are not easily peeled, and they have enough sensitivity so that they can be used in electrophotographic techniques such as photocopying, micro-films or on printing paper.

Having now generally described the invention, a further understanding can be obtained by reference to certain specific examples which are provided herein for purposes of illustration only and are not intended to be limiting unless otherwise specified. In the following examples, the term "part" means "part by weight."

EXAMPLE 1

A 3.0 g. amount of polyepichlorohydrin (manufactured by Japan Zeon under the trademark Zecron), 8.0 g. of carbazole and 3.0 g. of sodium hydroxide were dissolved in 225 ml. of dimethylformamide, and the mixture was stirred at 70° C. for 9 hours. A photoconductive polyether containing carbazole groups (97% of the chlorine atoms were substituted with the carbazole groups) was obtained. The substitution rate was calculated from the N and Cl values of the elementary analysis, and the amount of free chlorine ion was measured by $AgNO_3$ titration.

The infrared spectrum of the polyether product showed characteristic absorption bands of carbazole at 3020, 1625, 1600, 1490, 1330, 747, 720 cm.$^{-1}$. The absorption band at 3410 cm.$^{-1}$ based on the N—H group of the carbazole was not observed. This suggests that the carbazole group is N-alkylated.

According to the NMR spectrum of the polyether product, peaks attributed to the carbazole ring protons as well as the alkyl protons were observed. The logest wave length observed in the ultraviolet absorption spectrum was at 344 m$\mu$ which is appropriate for polyvinylcarbazoles.

10 Parts of the resulting polyether and 0.1 part of 2,4,7-trinitrofluorenone were dissolved in 250 parts of tetrahydrofuran to prepare the photoconductive composition. The solution of the composition was coated on an aluminum plate to a thickness of 10$\mu$ after drying. The resulting photoconductive layer was negatively charged by a corona discharge in the absence of light, and a negative diazo microfilm was placed on it. The layer was then exposed to the light from a 100 v., 100 w. tungsten lamp from a distance of 50 cm. for 1 second, and then it was developed with a liquid electrophotographic developer to give a visible image with high resolution and high contrast.

EXAMPLE 2

The solution of the photoconductive composition of Example 1 was coated on an aluminum plate to a thickness of 10$\mu$ after drying. The resulting photoconductive layer was positively charged, and was exposed through a positive electrophotographic test-chart to light. A powdery developer with a negative charge was then scattered on it to give a visible image which corresponds to the original test-chart.

A treated paper was placed on the image, and it was charged by a corona discharge so that the powdery developer of the image was transferred to the paper. A fixed transferred image was obtained by heating the paper with an infrared lamp.

EXAMPLE 3

10 Parts of the photoconductive polyether of Example 1 and 0.05 parts of anthraquinone were dissolved in 250 parts of tetrahydrofuran to prepare a composition of this invention. The solution of the composition was coated on a polyester film treated with a conductive material to a thickness of 10$\mu$ after drying. The resulting photosensitive layer was negatively charged by a corona discharge, and then was exposed through a continuous tone positive film to the light from a 15 w. fluorescent lamp (Mitsubishi Denki Co., Ltd., FL15SBL-360) from a distance of 40 cm. for 1 second to give a visible image corresponding to the original image.

EXAMPLE 4

The procedure of Example 1 was followed except that 0.01 part of methylene blue and 0.3 part of 1-chloro-5-nitro-9.10-anthraquinone were used as the sensitizer instead of trinitrofluorenone, and methylene chloride was used instead of tetrahydrofuran as the solvent. The solution was coated on an aluminum plate to form a photoconductive layer. The layer was exposed to light as described in Example 1 to give a visible image with high contrast.

EXAMPLE 5

10 Parts of the photoconductive polyether of Example 1 were dissolved in 250 parts of tetrahydrofuran to prepare a composition of this invention. The solution of the composition was coated on each of the substrates in the Table to form a thin layer. The adhesion and bending properties of the thin layer were tested by appearance, an adhesive tape test and a bending test to give the results shown in Table I. The adhesion and bending properties of a thin layer of polyvinylcarbazole and polyvinylcarbazole containing 20 wt. percent dioctyl phthalate were also tested and are shown in the Table as the reference.

TABLE I

| | | Flat Al plate | | Rough surface Al plate | | Polyester film | |
|---|---|---|---|---|---|---|---|
| | Polymer | Adhesion | Bending | Adhesion | Bending | Adhesion | Bending |
| Example 5 | Polyether (97% of the chlorine atoms were substituted with carbazolyl groups). | Excellent | Excellent | Excellent | Excellent | Good | Good. |
| Reference | Polyvinyl carbazole. | Poor | Poor | Slightly poor | Slightly poor | Poor | Poor. |
| | Polyvinyl carbazole containing 20 wt. percent dioctyl-phthalate. | | | | | Slightly poor | Slightlypoor. |

EXAMPLE 6

A 4.0 g. amount of copolymer of epichlorohydrin and ethylene oxide (the molar ratio of epichlorohydrin to ethylene oxide is 45:55 as manufactured by the Goodrich Co., Ltd., trade name Hydrin 200) and 20 g. of carbazole were dissolved in 200 ml. of dimethylformamide. A 4.0 g. amount of sodium hydroxide was then added to the solution and the mixture was reacted at 80° C. for 8 hours under an argon atmosphere to give a photoconductive polyether wherein 91% of the chlorine atoms was substituted with carbazolyl groups. 10 Parts of the resulting photoconductive polyether and 0.1 part of 2,4,7-trintrofluorenone were dissolved in 100 parts of 1,2-dichloroethane, and the solution was coated on an aluminum plate with a Baker applicator until a membrane of a thickness of 10$\mu$ was obtained after drying.

The resulting photoconductive layer was positively charged by a corona discharge in a dark room, and then it was exposed through a transparent original picture to the light from a 100 w. tungsten lamp from a distance of 30 cm. for 1 second. The layer was developed with a liquid electrophotographic developer until a clear visible image was obtained.

EXAMPLE 7

A 4.0 g. amount of polyepichlorohydrin (manufactured by Goodrich Co., Ltd., trade name Hydrin 100), and 15.0 g. of indole were dissolved in 200 ml. of dimethylformamide. A 4.0 g. amount of sodium hydroxide was then added to the solution and the mixture was stirred at 75° C. for 9 hours under an argon atmosphere to give a photoconductive polyether wherein 95% of the chlorine atoms were substituted with indolyl groups.

In accordance with the process of Example 6, the photoconductive polyether was coated on an aluminum plate and the layer was charged and exposed through a transparent original picture with the light from a 100 w. tungsten lamp from a distance of 30 cm. for 3 seconds. The layer was developed with a liquid electrophotographic developer to give an accurately reproduced visible image.

In this process, indole was replaced with pyrrole and a similar result was obtained.

EXAMPLE 8

A 3 g. amount of a polymer of 3,3-dichloromethyloxetane (manufactured by Hercules Powder Co., Ltd., under the trade name of Penton) was added to 150 ml. of N-methyl-2-pyrrolidone and the mixture was heated and stirred. The undissolved polymer was separated, and then 20 g. of carbazole and 2.0 g. of sodium hydroxide were added to the solution. The mixture was reacted at 80° C. for 7 hours under an argon atmosphere to give a photoconductive polyether wherein 13% of the chlorine atoms were substituted with carbazolyl groups. An accurate, reproduced image was obtained on a photoconductive layer prepared with the photoconductive polyether.

EXAMPLE 9

A 3.0 g. amount of a polymer of 2-chloroethylvinylether which was prepared by polymerizing 2-chloroethylvinylether in the presence of borontrifluoride etherate and 15 g. of carbazole were dissolved in 150 ml. of dimethylformamide. Subsequently, 2.5 g. of sodium hydroxide was added to the solution and the mixture was heated and stirred at 70° C. for 6 hours under argon atmosphere to give a photoconductive polyether within 100% of the chlorine atoms were substituted with carbazolyl groups.

According to the infrared spectrum of the polyether absorption bands at 770, 740, 660 cm.$^{-1}$ attributable to 2-chloroethylvinylether disappeared, and absorption bands at 3040, 1625, 1595, 1480, 750, 720 cm.$^{-1}$ were observed which indicated that the chlorine atoms of the polyether had been substituted with carbazolyl groups.

An accurate, reproduced image was obtained on a photoconductive layer prepared from a solution containing the photoconductive polyether.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A photoconductive polyether containing ether bonds in the principal or side chains thereof and containing pyrrole rings in the side chains which polyether contains repeating units with the formula I, II, III or IV

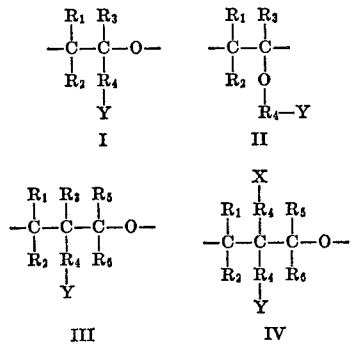

wherein $R_1$, $R_2$, $R_3$, $R_5$ and $R_6$ represent a hydrogen atom, a lower alkyl group or an aryl group; $R_4$ represents a $C_{1-6}$ alkylene group; X represents a halogen atom or a group containing a pyrrole ring attached to the $R_4$ at the pyrrole nitrogen atom; and Y represents a group containing a pyrrole ring attached to the $R_4$ at the pyrrole nitrogen atom.

2. The photoconductive polyether according to Claim 1, which is prepared by reacting a polyether containing halogen atoms with pyrrole, carbazole, indole or derivatives thereof which are substituted with inert groups selected from the group consisting of halogen, nitro, cyano, lower alkyl, aryl, alkoxy or aryloxy groups substituted thereon.

3. The photoconductive polyether according to Claim 1 which has a unit formula I', II', III' or IV'

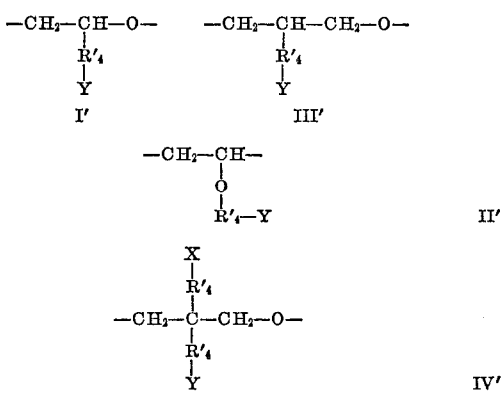

wherein $R'_4$ represents a methylene or ethylene group, X represents a halogen atom or a group containing a pyrrole ring attached to the $R'_4$ at the pyrrole nitrogen atom, and Y represents a group containing a pyrrole ring attached to the $R'_4$ at the pyrrole nitrogen atom.

4. The photoconductive polyether according to Claim 1 which contains units having the formula

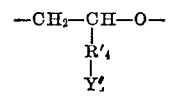

wherein $R'_4$ represents a methylene or ethylene group and Y' represents a carbazole group which is substituted with inert substituents selected from the group consisting of halogen, nitro, cyano, lower alkyl, aryl, alkoxy, or aryloxy groups.

5. The photoconductive polyether according to Claim 1 which is prepared by substituting all or a portion of the halogen atoms of a polyether containing halogen atoms with pyrrole, carbazole, indole or derivatives thereof containing inert substituent groups selected from the group consisting of halogen, nitro, cyano, lower alkyl, aryl, alkoxy, and aryloxy groups.

6. A photoconductive polyether composition comprising the photoconductive polyether according to Claim 1 and a photosensitizer.

7. A process for preparing the photoconductive polyether accordin to Claim 1 which comprises reacting a polyether containing halogen atoms with a compound containing a pyrrole ring which is selected from the group consisting of carbazole, indole, and derivatives thereof substituted with inert substituent groups selected from the group consisting of halogen, nitro, cyano, lower alkyl, aryl, alkoxy and aryloxy groups.

8. The process according to Claim 7, wherein said polyether containing halogen atoms is a polymer prepared by polymerizing a monoepoxy compound containing a halogen atom wherein the substitution reaction is conducted in an aprotic solvent containing an alkaline compound to substitute from 5 to 100% of the halogen atoms of the polyether with a compound containing a pyrrole ring such as pyrrole, carbazole, indole or derivatives thereof having an inert substituent group selected from the group consisting of halogen, nitro, cyano, lower alkyl, aryl, alkoxy and aryloxy groups.

9. The process according to Claim 8, wherein said monoepoxy compound containing a halogen atom is polymerized with a monoepoxy compound containing no halogen atoms.

10. The process according to Claim 7, wherein polyepichlorohydrin is reacted with carbazole in the presence of an alkaline compound in a solvent to substitute from 5–100% of the chlorine atoms of polyepichlorohydrin with carbazole.

11. A photoconductive polyether of Claim 1 which is prepared by reacting a polyether containing halogen atoms with pyrrole, indole, carbazole or derivatives thereof which derivatives contain an inert substituent selected from the group consisting of halogen atom, nitro, cyano, lower alkyl, aryl, alkoxy, or aryloxy groups.

12. A photoconductive polyether of Claim 1 which is prepared by polymerizing an epoxy compound containing a halogen atom and reacting said polymerized epoxy compound with pyrrole, indole, carbazole or derivatives thereof which derivatives contain an inert substituent selected from the group consisting of halogen, nitro, cyano, lower alkyl, aryl, alkoxy, or aryloxy groups.

13. The photoconductive polyether of Claim 1 which is prepared by polymerizing epichlorohydrin and reacting said polymerized epichlorohydrin with carbazole.

References Cited

UNITED STATES PATENTS 3,625,684  12/1971  Poot et al. _____ 96—1.5

OTHER REFERENCES

Chem. Abstracts, 73, 99392z.
Chem. Abstracts 73, 125740e.

WILLIAM H. SHORT, Primary Examiner

E. A. NIELSEN, Assistant Examiner

U.S. Cl. X.R.

96—1.5; 260—2 XA, 91.1 S, 315, 326.16, 326.5 R